E. L. SMITH.
CLEVIS.
APPLICATION FILED MAR. 22, 1913.
1,113,256.
Patented Oct. 13, 1914.
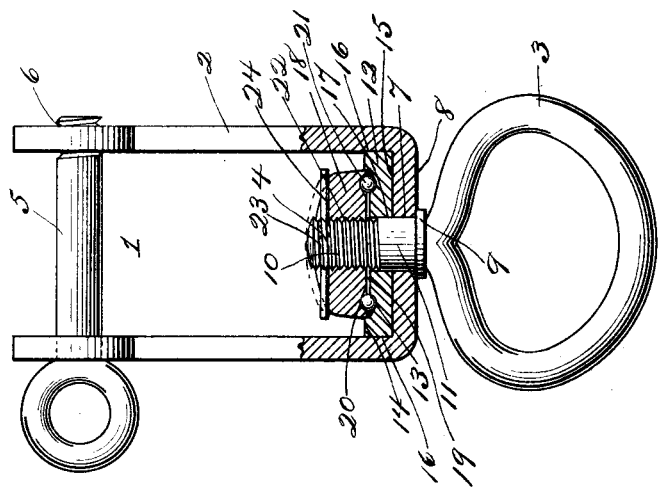
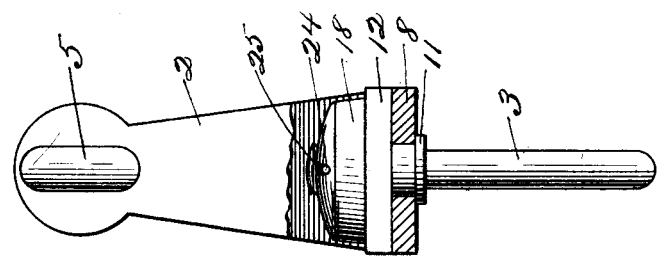
Witnesses
T. P. Britt
E. C. Duffy
Inventor
Elmer L. Smith,
By O. C. Duffy
Attorney

UNITED STATES PATENT OFFICE.

ELMER L. SMITH, OF WEST UNION, WEST VIRGINIA.

CLEVIS.

1,113,256.  Specification of Letters Patent.  Patented Oct. 13, 1914.

Application filed March 22, 1913. Serial No. 756,246.

*To all whom it may concern:*

Be it known that I, ELMER L. SMITH, a citizen of the United States, residing at West Union, in the county of Doddridge and State of West Virginia, have invented certain new and useful Improvements in Clevises; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a clevis for use on plows and other agricultural implements and the like, and has for its object to provide an improved frictionless clevis so constructed and arranged that the eye of the clevis is free to turn and to assume a position of least strain and resistance.

With this object in view the invention consists in the novel construction of the clevis and particularly in the novel construction of the frictionless bearing.

The invention also consists in the combination of parts forming the frictionless bearing for the clevis which provides for a ready removal of any or all of the parts should any undue wear or breakage occur to any or all of the parts of the bearing.

Referring to the accompanying drawing: Figure 1 is an elevation partly in section of a clevis constructed in accordance with my invention, and Fig. 2 is a side elevation partly in section of the clevis.

Like numerals of reference indicate the same parts throughout the two figures in which;

1 indicates the clevis which comprises the clevis frame or yoke 2, the clevis eye 3 having a stem 4, and 5 indicates the clevis pin which enters the clevis frame or yoke 2 and is threaded therein at 6 as shown in Fig. 1.

The clevis frame or yoke 2 is provided with a perforation 7 in its end portion 8 to receive the stem 4 of the clevis eye 3, the stem 4 being provided with an annular shoulder 9 which acts as a stop for the clevis stem, said shoulder engaging the end portion 8 of the clevis frame or yoke 2 as clearly shown in the two figures. The clevis stem 4 is threaded at 10 while a small portion of the stem 4 is not threaded but is smooth as shown at 11, this smooth portion 11 lying within the perforation 7 in the end portion 8 of the clevis frame or yoke 2 so as to effect a smooth bearing between the stem and the opening or perforation 7 in the clevis yoke.

12 indicates the outer bearing plate which is provided with a ball-race 13 on its inner face 14. The outer face 15 of the said plate is flat and lies closely against the inner face of the outer portion 8 of the clevis yoke 2, the ends 16 of the plate 12 being square to engage the arms of the yoke 2 as clearly shown in Fig. 1, said plate being provided with a central perforation 17 through which the stem 4 of the clevis ring 3 passes. This construction of the plate 12 insures at all times a proper positioning of the same within the clevis yoke 2 and absolutely precludes any rotation of the same relatively to the yoke 2 which it will be noted is accomplished without any fastening or locking whatever.

18 indicates the inner bearing plate which is provided with an outer flat face 19 in which is formed a ball-race 20 registering with the ball race 13 in the outer bearing plate 12, a series or race of balls 21 being interposed between the two bearing plates 12 and 18 and lying within the two races 13 and 20, as is clearly shown in Fig. 1. The inner bearing plate 18 is provided with a central threaded bore 22 and the said plate is threaded on the threaded portion of the stem 4 into position shown in Fig. 1, the inner plate 18 being shown also in dotted lines in Fig. 1 to illustrate the adjustability of the said inner plate 18 in order to take up wear on the balls or races.

The inner end of the stem 4 is provided with a transverse perforation 23 to receive a cross pin 24, and the inner face of the inner plate 18 is provided with a transverse groove 25 (Fig. 2) within which the cross pin 24 lies, the said pin being inserted in the transverse perforation in the stem 4 after the inner plate 18 has been threaded on the stem 4, said pin lying within the transverse groove 25 of the inner plate 18 to lock the same in position and to prevent the said inner plate from rotating relatively to the stem 4.

It will be at once apparent from the foregoing description and the accompanying drawings that the inner plate 18 being locked to the stem 4, said plate rotates with the stem and consequently a frictionless bearing is effected between the inner plate 18 and the outer plate 12 to take the draft on the clevis ring 3, and as the inner plate 18 rotates with the stem 4 and the outer plate 12 is locked by reason of its form within the clevis yoke 2 no relative rotation between the inner plate 18 and the stem 4, nor the outer plate 12 and the clevis yoke 2, can possibly occur. This is a material feature of this construction, and another advantageous and material feature lies in the fact that upon wear occurring between the inner plate 18 and the outer plate 12 either one or both, can be quickly and easily removed from the clevis and renewed without in any way substituting the clevis ring or stem, or the clevis yoke.

Having thus fully described the invention what I claim as new and desire to secure by Letters Patent of the United States, is:—

A device of the type described including a yoke having a central transverse portion and arms extending therefrom, the said central transverse portion being provided with a central aperture, a bearing plate having a central aperture in line with said central aperture in said central transverse portion, said bearing plate having its end portions in engagement with the arms of said yoke to prevent rotation of said bearing plate relatively to said yoke, said bearing plate being provided with an annular ball race in its outer face, an opposed bearing member provided with a central threaded aperture and an annular ball race on its inner face to register with the said ball race in the first mentioned bearing plate, a series of balls arranged in said ball races, a clevis eye having a stem provided with a threaded end, said stem being received in the central apertures of the said central transverse portion of the yoke, and of the first mentioned bearing plate, the said threaded end of the said stem being threaded directly into the central threaded aperture of the second mentioned bearing plate, and means for locking said second mentioned threaded bearing plate to said threaded end of said stem to insure rotation of said second mentioned bearing plate relatively to the first mentioned stationary bearing plate when said clevis eye and stem are rotated substantially as described.

In testimony whereof, I affix my signature, in presence of two witnesses.

ELMER L. SMITH.

Witnesses:
A. M. WARNER,
CHAS. MILLER.

---

Copies of this patent may be obtained for five cents each, by addressing the "Commissioner of Patents, Washington, D. C."